United States Patent
Ellerbrok et al.

(10) Patent No.: US 6,352,283 B1
(45) Date of Patent: Mar. 5, 2002

(54) GAS BAG RESTRAINT SYSTEM

(75) Inventors: Norbert Ellerbrok; Gerd Jürgens, both of Alfdorf (DE); Gianula Knödler, Schwäbisch Gmünd; Swen Schaub, Alfdorf, all of (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/359,027

(22) Filed: Jul. 22, 1999

(30) Foreign Application Priority Data

Jul. 22, 1998 (DE) ..................... 298 13 082 U

(51) Int. Cl.⁷ ............................................. B60R 21/16
(52) U.S. Cl. ..................................... 280/743.1
(58) Field of Search .................... 280/743.2, 743.1, 280/731

(56) References Cited

U.S. PATENT DOCUMENTS

| | | | |
|---|---|---|---|
| 4,007,685 A | * 2/1977 | Nimylowyez | 280/741 |
| 5,048,863 A | * 9/1991 | Henseler et al. | 280/743.1 |
| 5,454,595 A | * 10/1995 | Olson et al. | 280/743.1 |
| 5,511,821 A | * 4/1996 | Meyer et al. | 280/743.1 |
| 5,599,040 A | * 2/1997 | Takahashi et al. | 280/729 |
| 5,732,973 A | 3/1998 | Turnbull et al. | |
| 5,871,231 A | * 2/1999 | Richards et al. | 280/735 |
| 5,899,495 A | * 5/1999 | Yamamoto et al. | 280/743.1 |
| 6,164,696 A | * 12/2000 | Ellerbrok et al. | 280/743.2 |

FOREIGN PATENT DOCUMENTS

| | | |
|---|---|---|
| DE | 19521071 A1 | 12/1995 |
| WO | WO 9746425 | 12/1997 |

* cited by examiner

*Primary Examiner*—Paul N. Dickson
*Assistant Examiner*—Faye M. Fleming
(74) *Attorney, Agent, or Firm*—Tarolli, Sundheim, Covell, Tummino & Szabo L.L.P.

(57) ABSTRACT

A gas bag restraint system includes a multi-stage inflator and a gas bag in flow connection therewith. The gas bag comprises a first and a second fabric part which are at least approximately congruent, and a fabric strip which is stitched to an edge of the first fabric part and to an edge of the second fabric part. At least one burst seam is provided which in an intact condition forms a fold as a result of which the volume of the gas bag is reduced as compared to a condition in which the burst seam is destroyed. The fold formed by the burst seam is arranged in the fabric strip.

8 Claims, 4 Drawing Sheets

GAS BAG RESTRAINT SYSTEM

BACKGROUND OF THE INVENTION

Gas bag restraint systems exist which include a multi-stage inflator and a gas bag in flow connection therewith, the gas bag comprising a first and second fabric part, which are at least approximately congruent, at least one burst seam being provided which in its intact condition forms a fold as a result of which the volume of the gas bag is reduced as compared to a condition in which the burst seam is destroyed.

Such a gas bag restraint system allows to provide a restraint effect optimally adapted to the conditions in each case. In case of low vehicle speeds and/or light weight of the vehicle occupant to be restrained as well as in case of a small distance of the vehicle occupant from the cover of the gas bag, only a first stage of the inflator is activated so that only a relatively small amount of compressed gas is made available for deploying the gas bag. In this case the burst seam remains intact so that the gas bag is fully deployed despite the low amount of compressed gas made available. By contrast, in case of high vehicle speeds and/or heavy weight of the vehicle occupant to be restrained as well as in case of a large spacing of the vehicle occupant from the cover of the gas bag, several stages of the inflator are activated so that a relatively large amount of compressed gas is made available for deploying the gas bag, resulting in the destruction of the burst seam on deployment of the gas bag, thus enlarging also the volume of the gas bag to accommodate the larger amount of compressed gas.

BRIEF DESCRIPTION OF THE INVENTION

The invention provides a gas bag restraint system including a multi-stage inflator and a gas bag in flow connection therewith. The gas bag comprises a first and a second fabric part which are at least approximately congruent, and a fabric strip which is stitched to an edge of the first fabric part and to an edge of the second fabric part. At least one burst seam is provided which in an intact condition forms a fold as a result of which the volume of the gas bag is reduced as compared to a condition in which the burst seam is destroyed. The fold formed by the burst seam is arranged in the fabric strip. This configuration permits a particularly simple and advantageous adaptation of the gas bag to specific requirements.

Advantageous configurations of the invention read from the sub-claims.

BRIEF DESCRIPTION OF THE DRAWINGS

The invention will now be described with respect to various embodiments as illustrated in the attached drawings in which.

DETAILED DESCRIPTION OF THE INVENTION

Figure 1:
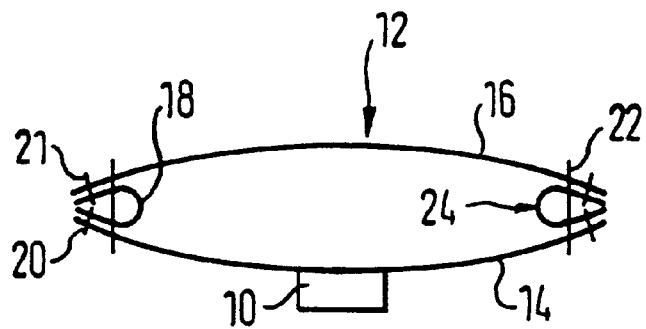
FIGS. 1 to 3 are cross-sections of a gas bag restraint system in accordance with the invention shown in three different conditions.

Referring now to FIGS. 1 to 4 there is illustrated a first embodiment of a gas bag estraint system in accordance with the invention. It contains a multi-stage inflator 10 in flow connection with a gas bag 12 consisting of a first fabric part 14, a second fabric part 16 and a fabric strip 18. The first and second fabric parts 14, 16 are configured approximately circular and congruent to each other, and the fabric strip 18 is stitched to the fabric parts 14, 16 along their circumferential edges by means of seams 20, 21.

Extending through the fabric parts 14, 16 and the fabric strip is a burst seam 22 securing the two fabric parts 14, 16 to each other in a short distance from their edge and thereby holding the fabric strip 18 in a fold 24 arranged in the direction of the interior of the gas bag 12 (see FIG. 1).

If the circumstances do not require the activation of all stages of the inflator, the pressure resulting in the interior of the gas bag 12 is not sufficiently high to destroy the burst seam 22, i.e. the fold 24 will still be present even when the gas bag is deployed.

Figure 2:
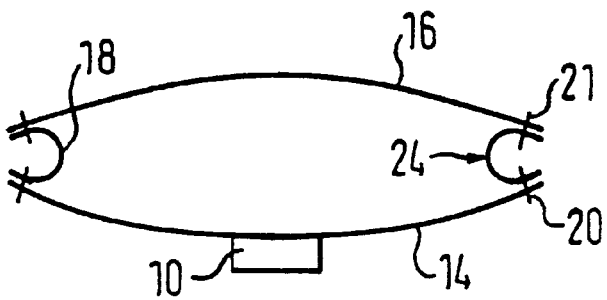
Figure 3:
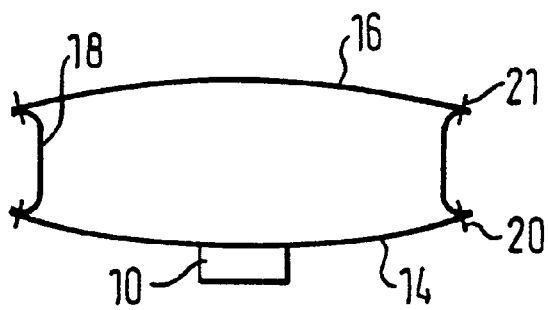
Figure 4:
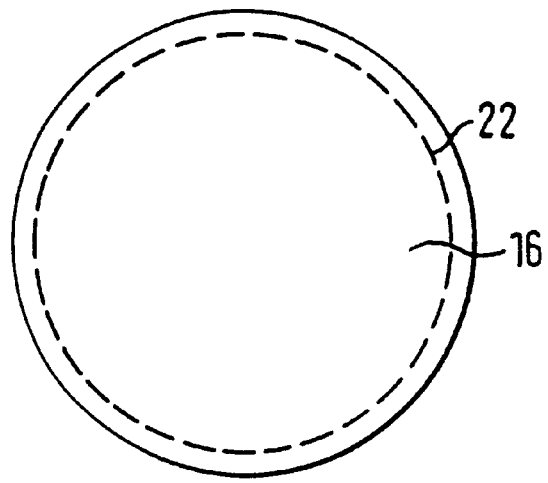
FIG. 4 is a schematic plan view of the gas bag as shown in FIGS. 1 to 3.

If, however, all stages of the inflator 10 are activated, the pressure building up in the interior of the gas bag results in the destruction of the burst seam 22 (see FIG. 2). As a result, the fold 24 is released and the gas bag is able to deploy to a larger volume(see FIG. 3).

Figure 5:
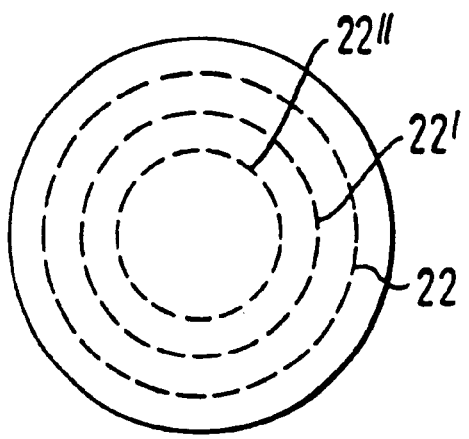
FIGS. 5 and 6 are a schematic plan view and schematic cross-section respectively of a second embodiment of the invention.
Figure 6:
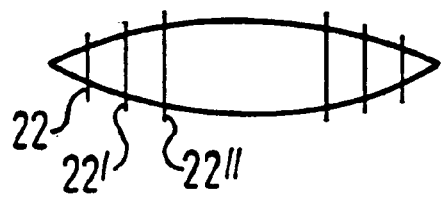

In FIGS. 5 and 6 is shown a second embodiment of a gas bag restraint system in accordance with the invention. This embodiment differs from the first embodiment by three burst seams 22, 22', 22" being provided arranged along concentric circles. The burst seams are dimensioned so that they are destroyed one after the other, thus allowing intermediate stages between a condition in which the burst seams are still filly intact and a condition in which the burst seams are totally destroyed.

Figure 7:
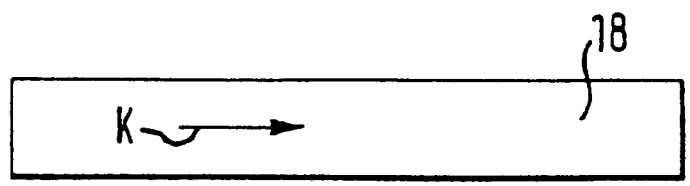
FIGS. 7 and 8 are developed views of the fabric strip employed in the gas bag of the gas bag restraint system in accordance with the invention.
Figure 8:
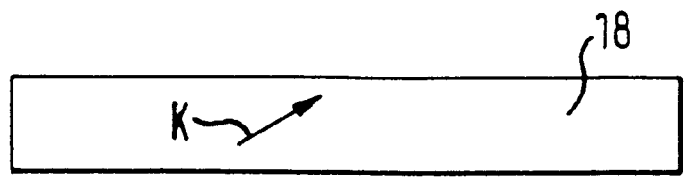

Referring now to FIGS. 7 and 8 two variants of the fabric strip 18 are shown, the arrow K symbolizing in each case the warp direction of the fabric employed. In FIG. 7 the warp direction is thus parallel to the longer sides of the fabric strip, resulting in only a slight transverse expansion when the gas bag is inflated. In FIG. 8, on the other hand, the fabric strip 18 is cut so that the warp direction runs obliquely to the longer sides. This results in a high transverse expansion when the gas bag is inflated, resulting in a reduction of stress peaks.

Referring now to FIGS. 9 to 13 various arrangements of the burst seam 22 are illustrated.

Figure 9:
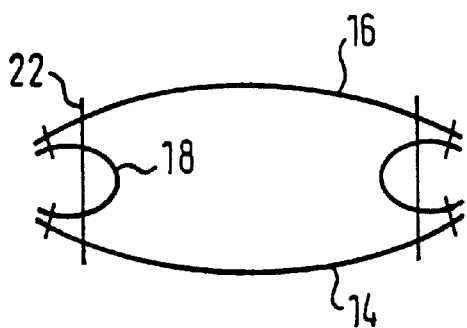
FIGS. 9 to 15 illustrate various arrangements of the burst seam in a gas bag of the gas bag restraint system in accordance with the invention.
Figure 10:
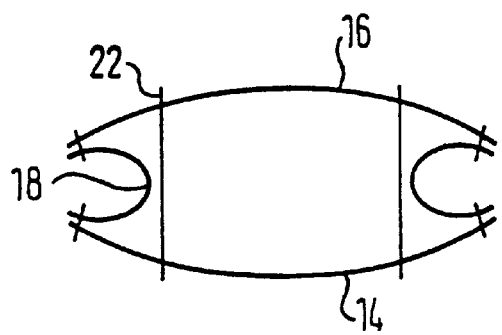

In the embodiment as shown in FIG. 9 the burst seam runs roughly centrally through the fold formed by means of the fabric strip 18, whereas in FIG. 10 the burst seam runs within the fold formed by the fabric strip 18; in this third configuration the difference in the volume of the gas bag between the condition with an intact burst seam and the condition in which the burst seam is destroyed is especially great.

Figure 11:
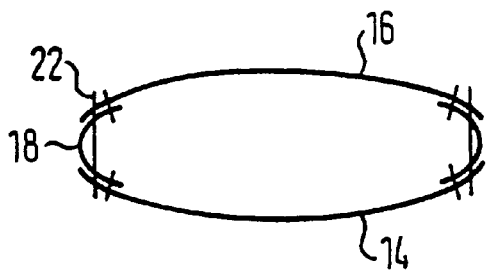

In the embodiment as shown in FIG. 11 the fabric part 18 is stitched to the edge portion of the fabric parts 14, 16, but in a distance of the outer circumference. In addition, the burst seam 22 extends through the fabric strip 18, the fold of which in this embodiment is not oriented towards the interior of the gas bag but to the exterior.

Figure 12:
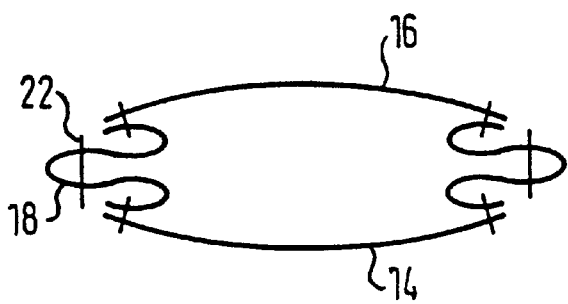
Figure 13:
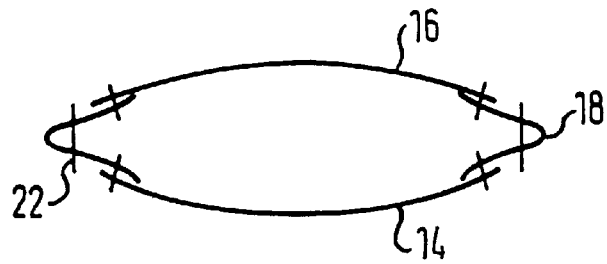

In the embodiment as shown in FIGS. 12 and 13, the fold formed by the fabric strip 18 is located almost completely outside of the gas bag. The burst seam 22 is only in contact with the fabric strip 18, but not with the fabric parts 14, 16.

Figure 14:
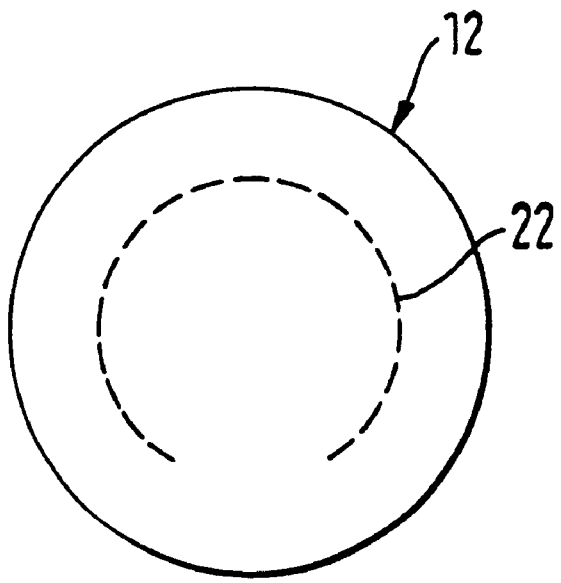

The burst seam 22 in the embodiment as shown in FIG. 14 extends over a circular arc. The burst seam is arranged so that its open portion faces the upper part of the body of the vehicle occupant to be restrained. In this way, the gas bag is first deployed in its portion facing the upper part of the body of the restrained vehicle occupant, this being the region in which a restraining action is first needed in time.

Figure 15:
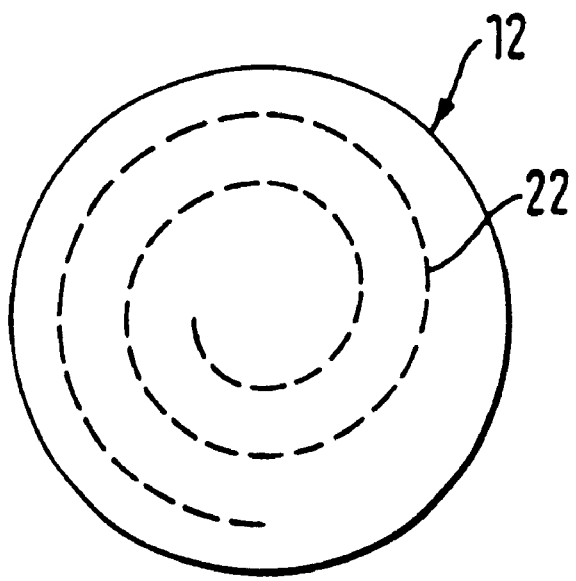

Referring now to FIG. 15 there is illustrated an embodiment of a burst seam extending over a spiral path. Depending on the volume of compressed gas made available by the inflator, this burst seam may be destroyed only in part. In this way, differing amounts of compressed gas made available, resulting e.g. from differing operating temperatures such as −35° C. or +85° C., can be accommodated by the gas bag with a volume adapted thereto.

The burst seam extening in a spiral path could be arranged in the form of a spiral with two threads. The ends of the theads arranged in the middle of the gas bag could in this embodiment be joined so as to form a continuous burst seam.

What is claimed is:

1. A gas bag restraint system including a multi-stage inflator and a gas bag in flow connection therewith, said gas bag comprising a first fabric part and a second fabric part separate from said first fabric part, said first and second fabric parts being at least approximately congruent, and a fabric strip which is stitched to an entirety of a circumferential edge of said first fabric part and to an entirety of a circumferential edge of said second fabric part, at least one burst seam being provided which in an intact condition forms a fold as a result of which the volume of said gas bag is reduced as compared to a condition in which said burst seam is destroyed, said fold formed by said burst seam being arranged in said fabric strip.

2. The gas bag of claim 1, wherein said first and said second fabric parts are circular.

3. The gas bag of claim 1, wherein said burst seam connects said first and said second fabric parts to each other.

4. The gas bag of claim 1, wherein said burst seam runs through said fabric strip.

5. The gas bag of claim 1, wherein said fold is arranged in the interior of said gas bag.

6. The gas bag of claim 1, wherein said fold is arranged outside of said gas bag.

7. The gas bag of claim 1, wherein several burst seams are provided which are destroyable one after the other.

8. The gas bag of claim 1, wherein said first and said second fabric parts are oval or elliptical in shape.

* * * * *